Sept. 28, 1971  A. H. HAUSER  3,608,456
INSTANT DEVELOPED PRINT IN DUAL METHODS CAMERA
Filed May 28, 1969

INVENTOR
ALLAN H. HAUSER
BY
Andrus, Sceales, Starke & Sawall
Attorneys

United States Patent Office 3,608,456
Patented Sept. 28, 1971

3,608,456
INSTANT DEVELOPED PRINT IN DUAL METHODS CAMERA
Allan H. Hauser, 12635 Gremoor Drive, Elm Grove, Wis. 53122
Filed May 28, 1969, Ser. No. 828,639
Int. Cl. G03b 35/08
U.S. Cl. 95—18   4 Claims

ABSTRACT OF THE DISCLOSURE

The disclosure includes a portrait camera having a beam splitter for directing the image of the subject onto a relatively small negative and simultaneously onto a substantially larger positive in combination. The negative film and the positive film are simultaneously moved through the camera in stepped relation for taking of sequential pictures. The positive film is held in a cartridge including a developing unit and is withdrawn through the developing unit. The developing unit includes a roll of a dry strip plastic and means to apply a developing liquid to the surface. The strip is driven past a pressure roller together with the positive film such that the developing liquid is applied to the positive film. A heater is energized to heat the film and developing liquid and thereby create a rapid, direct and in situ development of the positive print. This permits essential immediate viewing of the resulting proof picture for purposes of analysis of the subject, arrangement and the like. The developing liquid is selected such that the proof picture fades in a relatively short period.

BACKGROUND OF THE INVENTION

Generally, in portrait photography, the subject is photographed with a plurality of different settings taken. The film is subsequently developed in a conventional developing apparatus with the various poses sorted, number interrelated and packaged for proofs. The proofs are then returned to the customer and the customer contacted regarding the desired picture. This, of course, is relatively time consuming, expensive and furthermore does not indicate the results of the photography until a time subsequent to the actual taking. It has been suggested that a pair of cameras be employed, one of which would provide an instant positive under known transfer from a negative to a positive process and the other of which retains related negatives. Such systems have not been accepted. The two cameras in adjacent relation do not in fact take identical images. Furthermore, the quality of the equipment results in a relatively expensive and bulky apparatus which is generally unsatisfactory, particularly for portable photography wherein the portraits are taken in the home or the like. If the two cameras are combined and the image beam split by a mirror, the negative image is reversed as a result of the deflection. Although instant processes are therefore available, they have not been readily adapted to portrait photography and the like where it is desirable to establish a negative and a related positive. Furthermore, the prior art positives are not satisfactory because they do not fade. Fading proofs are a practical necessity in portrait photography.

SUMMARY OF THE INVENTION

The present invention is particularly directed to a highly improved camera for simultaneously establishing a negative and a related fading proof positive which can be dispensed immediately for purposes of viewing.

The use of the direct positive is of very substantial significance in connection with the present invention. Thus, in prior art direct positive photography, there is a formation of a negative with a subsequent transfer to a positive paper in situ. This, however, requires a reversed image and, as a result, this inversion of the image in going from the negative to the positive paper will have a proper reading print left to right. This process would require a second reflection if it were to be used in the camera disclosed, and in turn would result in a fogging of the image on the negative plate, particularly when employing portrait type lenses. The instant proof process of the present invention will essentially reduce and eliminate all of the time presently required in transporting of the film to a central processing location, the usual developing to obtain the proofs and subsequent return to and contact with the customer. In addition, the final portrait can be supplied to the customer in a much shorter period of time as the customer is immediately given the necessary proofs from which to determine the particular photographs desired.

Generally, in accordance with the present invention, the camera includes a beam splitter in alignment with the lens for directing of the image directly onto an aligned portion of a negative and simultaneously on an aligned portion of a positive film. In a particularly novel aspect of the present invention, the lens of the camera is a zoom-type lens having an unusually long focal length. Thus, the lens may be in the order of 6 to 10 inches with the focal length being approximately 200 millimeters or the like. This structure is particularly adapted for portrait photography. The long focal length, with its greater depth of field and improved area of sharpness for focusing, will eliminate distortion and the need for critical focusing, as in present portrait work.

The negative film and the related positive film are mounted as an elongated strip, preferably in the form of related rolls. A drive means is provided, such as an electrical drive motor with the coordinated drives interconnected to the two film strips and producing a related movement of the two strips. A suitable automatic numbering means can be applied to the two strips to provide subsequent direct interrelationship between the positive and the negative pictures. In the employment of the beam splitter, the reflected image, which is applied to the diaversal paper for making of an instant positive, inverts the image from that applied to the negative and, therefore, provides a proper and direct reading from left to right of the object or subject when developed. The strip may then be passed directly through a special direct processing unit to immediately develop and establish a positive of the subject. In accordance with the present invention, the diaversal paper film is passed over developing element simultaneously with a strip of film material carrying a liquid developer. The dry strip is carried as a roll in a relatively sealed container forming a part of a film cartridge having a thin discharge nozzle portion projecting tangentially from the container and located adjacent the developing element. The end of the dry strip is drawn over an applicator within the cartridge member which preferably includes a resilient sealing member. The applicator is connected through a suitable wicking material to a main developing liquid chamber to transfer developer liquid directly to the dry strip as it is removed to insure even developing fluid over the surface of the dry plastic strip film for even development of the positive print. In accordance with a particular novel aspect of the present invention, a heating means is mounted in the path of the exposed film and is actuated in timed relation to the movement of the film to control the in situ development of the film.

In a preferred construction of the present invention, the camera is provided with the special shutter means for closing of the openings to the respective films in timed relation to the lens shutter. In addition, a composing view means is provided in combination with a reflecting means adapted to be positioned in the path of the image from the lens. The reflecting means is removably mounted for viewing positioning or composing positioning and removal while the actual photograph is being taken. It is interrelated to the closing means to cover the openings to the film structure during the composing to thereby insure or prevent transfer of any image or fogging during this particular period or otherwise exposure of the related film strips.

An enlarging lens element is aligned with the image beam aligned with the diaversal film to enlarge the size of the positive relative to that of the negative, if desired. Furthermore, the lens means of the present invention is preferably constructed with a pair of spaced lens elements for increasing of the size of the image on the positive paper. Generally, a first lens element, including a pair of concave lens members are mounted in back-to-back relation with a spacer disposed therebetween. A secondary lens element having a convex surface and a lower planar lens is similarly interconnected with a spacer therebetween. By properly ground radius and selection of spacer sizes, applicant has found that the positive or an accurate enlarged image is obtained. The result is a pair of identical images of two different sizes of the subject which produces a positive proof copy. A means for controlling exposure for different film speeds is positioned between either film plate, so as to afford equal quality exposures.

This is an advantage in portrait type photography where an enlarged positive can be obtained for proof purposes where the customer can then directly review the positives and decide which is to be made into the desired portrait.

The use of a small negative will cut the cost of film and the use of the long rolls rather than individual sheets, presently employed in portrait photography, will establish a further cost economy.

The drawing furnished herewith illustrates the best mode presently contemplated by the inventor for carrying out the subject invention in which the above advantages and features are thoroughly disclosed as well as others which will be readily understood from the following description of the preferred embodiment.

Figure 1:
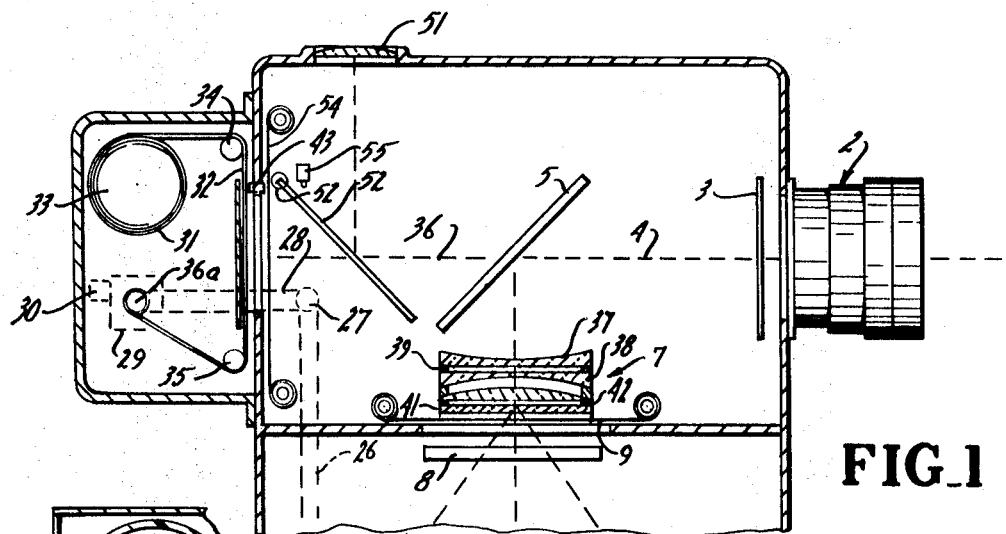
FIG. 1 is a diagrammatic illustration of a camera constructed in accordance with the present invention.
Figure 3:
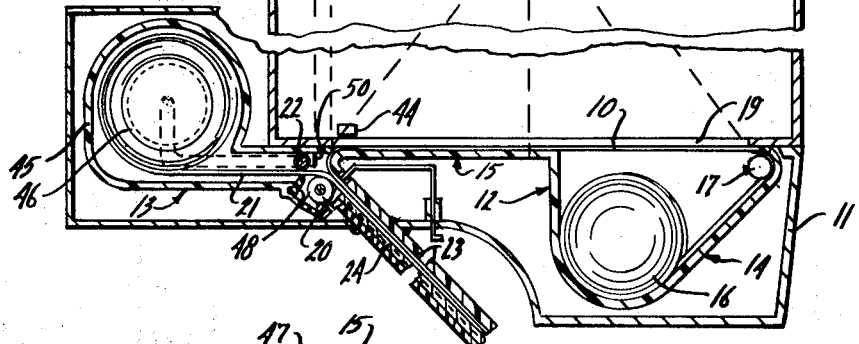
FIG. 3 is a fragmentary top view of the structure shown in FIG. 2.
Figure 3:
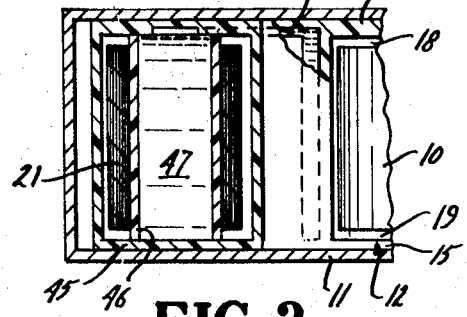

Referring to the drawing and particularly to FIG. 1, the illustrated camera 1 is a generally rectangular member having a lens 2 interconnected to the upper end thereof in alignment with an internally mounted lens shutter 3. The subject, not shown, to be photographed is aligned along the image center line of the lens 2. The lens 2 is, in accordance with a particularly satisfactory aspect of the present invention a zoom lens having a long focal length. Thus, generally, the lens 2 preferably has a focal length of the order of 200 millimeters in contrast to the more conventional zoom type lens of an 8 or 16 millimeters. The lens 2 may be any suitable photographic lens but the zoom lens is particularly desirable for portrait work in that it essentially eliminates the necessity for separate focusing of the unit.

The image is projected via the lens 2 into the camera 1 shown diagrammatically by a center image line 4 upon the opening of the shutter 3. In accordance with the present invention, an image splitting mirror 5 is mounted in the path of the image line 4. The mirror 5 is of a known construction to transmit the image through the mirror 5 and to simultaneously deflect the image downwardly along an image line 6 through a special enlarging lens unit 7 and an exposure control 8. The deflected image 6 is adapted to be transmitted downwardly through the unit 7, a dark slide shutter 9 and exposure control 8 onto an aligned positive film 10, shown supported to the bottom side of the camera in a suitable housing or holder 11.

The present invention employs a special cartridge 12 including a self-contained developing unit 13 to one end connected to a film roll magazine 14 at the opposite end by planar housing portion 15. The film roll magazine 14 is a cylindrical housing within which a roll of film 16 is disposed. The film 10 extends over a roller 17 in the adjacent upper portion of the cartridge 12 and then through the housing portion 15 to a curved wall 18. The upper wall of the housing portion 15 includes an opening 19 from roller 17 to the curved wall 18 to expose the film to the corresponding image pattern established by the enlarging lens unit 7.

Figure 2:
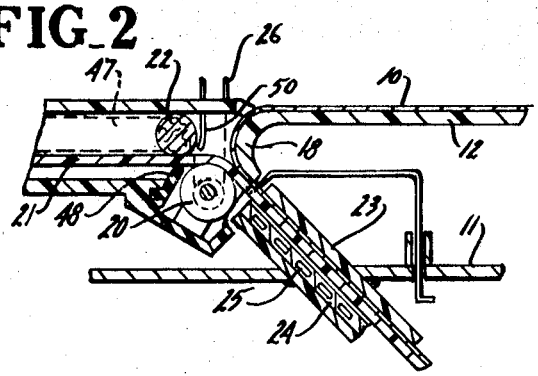
FIG. 2 is an enlarged fragmentary sectional view of the special cartridge shown in FIG. 1 and constructed in accordance with the present invention.

The film 10 is discharged from cartridge 12 between a roller 20, which is rotatably mounted with the cartridge, and curved wall 18 adjacent the developer unit 13 and then through a suitable downwardly projected opening in the cartridge 12; as shown in FIGS. 1 and 2. As it moves over the wall 18, a dry plastic strip 21 is withdrawn from a container of the unit 13 over a liquid applicator pad 22 and then moved onto the exposed face of the exposed film 10. The developing liquid when applied to the exposed surface of the film 10 develops the picture image. The pressure roller 20 cooperates with the curved wall 18 and positively forces the strip 21 and particularly the developing liquid thereon into engagement with the exposed face of the film 10. This results in the in situ processing of the strip 10 and the formation directly of a positive of the image exposed. As the film 10 is removed from the cartridge 12, it passes through a heated passageway 23 in the housing 11. The passageway 23 is shown generally corresponding to the film with the one wall formed by plate-like sheet 24 of alumina oxide within which a Nichrome heating element is embedded. The element 25 is connected to a power source as hereinafter described to heat the film 10 and developing liquid and cause the developing process to rapidly peak out and establish development at a selected temperature essentially independently of the environment.

In accordance with the present invention, the film strip 10 is moved in a stepped manner through a special drive mechanism to provide a coordinated movement of the film strip with a second film strip, as subsequently described.

In the illustrated embodiment of the invention, the pressure roller 20 is provided with a drive gear, not shown. A suitable pulley or chain drive 26 releaseably interconnects the gear to an idler pulley 27 secured to the upper end of the camera. The idler pulley 27 is coupled through a chain drive 28 to a drive motor 29. The motor 29 is cyclically operated as a result of a manual input to rotate the film 10 through a predetermined length for each cycle of the motor. Thus, in the illustrated embodiment of the invention, the motor 29 is manually started and operates a self-cycling stop or limit switch 30 to terminate a cycle motor operation.

The motor 29 is secured to a second film cartridge or container 31 within which a negative film 32 is supported on a roll 33 and selectively moved over a pair of rollers 34 and 35 in alignment with an opening for receiving the directly transmitted image 4 which passes through the mirror 5, as shown by the image line 36. Thus, the film strip 32 is passed over the rollers 34 and 35 to a take-up drive shaft 36 carried by and driven from motor 29. The interconnecting drive between motor 29 to the shaft 36 for film 32 and the drive to the roller 20 for the strip 10, is interrelated in accordance with the respective sizes of the photographs to be taken.

Film strip 32 is a negative strip adapted to take a series of negatives of one or more subjects by sequential actuation of the camera structure. Thus, the magazine or container 31 may be of any of the conventional varieties presently employed in portrait taking which employs the taking of a negative which is subsequently employed with the making of a proof copy and the final portrait. The negative may be a relatively small sized image which is subsequently enlarged to the desired portrait size. In the present invention where the positive of the film 10 is to be employed for viewing purposes in the nature of a portrait proof, the size of the positive must be relatively large relative to the size of the negative.

Although the lens 7 may be of any suitable construction, they are preferably constructed in accordance with the teaching of the present invention as follows. The lens 7 is formed of a pair of lens members 37 and 38 forming a lens A having concave surfaces and planar back surfaces. The members 37 and 38 are mounted in back-to-back relation with a spacer 39 therebetween. A lens member 40 having a convex outer surface interconnected to a second lens member 41 having a planar front and back surface. The lens members are similarly interconnected with a spacer 42 therebetween to form a lens B. Applicant has found that a preferable lens specification for magnifying a field 1.55555× in each coordinant and preferably constructed as follows.

Lens A

Glass $N_D$, 1.517; V, 64.5
Diameter, 3.792"; center thickness, .244"
1st surface: radius, 7.198"; sagitta, .254"; concave
2nd surface: radius 7.198"; sagitta, .254"; concave
Edge bevels, 45°; .020" faces Spacer Thickness, .014"
Outside diameter, 3.785"
Inside diameter, 3.685"

Lens B

Glass $N_D$, 1.649; V, 33.8
Diameter 3.792"; center thickness, .488"
1st surface: radius, 8.847"; sagitta, .206"; convex
2nd surface plano: sagitta, .000"; plano
Edge bevels, 45°; .020" faces
EFL: A-spacer-B combination, 14,363406" [1]
J: A-spacer-B combination, 0.590444" [1]
Center thickness: A-spacer-B, .746" [1]

[1] Can be used to calculate other magnifications.

As used to magnify a field 1.55555× in each coordinate,

Rear of lens B to new focus, 7.389"
Old focus to new focus, 3.075"

With a 12" primary lens, and magnification 1.55555×, EFL of combination 18.6666667", aperture up to f/6.0 (new) (12" aperture up to 3.111"), and new field diagonal 5.833" (rectangular field 3.50" x 4.667")

In order to maintain identification of the images on the film 32, the apparatus or camera is preferably provided with number marking devices 43 and 44 mounted respectively adjacent the film strips 10 and 32. The number marking devices 43 and 44 are momentarily actuated during each operation of motor 29 to apply a correspondingly coated identification number or mark to the aligned portions of the films 32 and 10.

The developing unit 13 includes a cylindrical housing 45 integrally connected with the housing portion 15. The roll of the developing dry film strip 21 is loosely wrapped about a center cylinder 46 which defines an essentially sealed inner developing liquid chamber 47 within which a suitable developing liquid is held. The strip 21 extends from the cylindrical housing 45 through the adjacent end of the housing portion 15 which forms a nozzle through the roller 20 and curved wall 18 with the positive film 10. The developing liquid applicator pad 22 is provided within the housing portion 15 adjacent the curved wall 18, and wipes across the upper surface of the strip 21 which is provided with a matted surface to carry the developing liquid from the pad 22 for application to the exposed film. A resilient lip 48 is preferably formed in the housing portion 15 to the backside of the strip 21 in alignment with the pad 22 to force the strip into engagement with the pad 22. The pad 22 is connected to the liquid within the chamber 47 by wick elements 49 which extend through the side walls of the housing portion 15 and the cylindrical housing 45 with the inner ends exposed to the liquid within the chamber 47. A curved wall 50 extends over the front of the applicator pad 22 to minimize the exposure of the pad and the tendency of the developing liquid to dry. The developer liquid is of a proper viscosity to flow or move by absorption and capillary action to maintain the applicator pad 40 in a moist condition. Therefore, developing liquid is applied positively to the surface of the strip 21 as it leaves the container and just before it is applied to the film 10.

The developing liquid may be of any suitable composition related to the positive film and the diaversal or diffusion transfer process of a positive film 10 having a silver containing coating. For example, the developing liquid may be similar to that shown in British Patent 856,792 which issued Apr. 24, 1959, and composed of:

| | Grams |
|---|---|
| Hydroquinone | 13.0 |
| Sodium sulfite | 40.9 |
| Sodium thiosulphate | 21.5 |
| Potassium bromide | 2.5 |
| Phenidone | 1.0 |
| Sodium hydroxide | 10.0 |
| Water | 26.0 |

In accordance with a particular aspect of the present invention, the developing liquid composition is formed with a fixing medium which results in rapid fading of the developed film. Thus, in the above composition, the sodium thiosulphate constitutes the "fixer" which prevents fading and the percentage would be reduced to minimize the stabilizing of the developed film with a resulting rapid fading.

The heating system is particularly advantageous in such a diaversal developing process which is generally a very slow process. The heating produces a faster response or ASA rating. As previously noted, this becomes particularly important where a series of pictures are to be taken in rapid succession; for example, in commercial portrait photography and the like. The heating will also result in improved consistency of color, density and contrast in the developed positive.

The operator locates the subject with respect to the camera 1 by use of a separate ground glass viewing opening 51 provided in the upper wall of camera 1. A composing mirror 52 is mounted within the camera 1 on a pivotal, manually positioned shaft 53. As shown in full line position in FIG. 1, the mirror 52 may be angularly related within the camera 1 extending downwardly across the path of the image line transmitted through the mirror 5. This in turn re-directs the image line upwardly into the viewing opening 51.

During this operation, it is, of course, important that the image light is not transmitted to either of the films 10 or 32. Each of the camera openings to the respective film 10 and 32 is provided with similar dark slide shutters 9 and 54 including a strip-like closure having a portion which provides continuous light sealing surface and another apertured portion which provides for transmitting of the image light to the films.

The dark slide shutters 9 and 54 are interconnected to each other and to the pivotally mounted mirror shaft 53 such that movement of the lever and mirror 52 downwardly to the viewing position results in the closing of the respective shutters prior to opening of shutter 3. A limit switch 55 may be mounted immediately adjacent to the shaft 53 and actuated by the movement of the mirror 52 from the dotted line position to the full line position to close the shutters. The shutters 9 and 54 open only when the mirror 52 is pivoted upwardly to the phantom line position. The operation of the illustrated embodiment of the invention is summarized in connection with the electrical circuitry shown in FIG. 4.

The photographer physically aligns the camera 1 and the subject to properly locate the subject. The mirror 52 is pivoted downwardly to permit viewing of the subject through the window 51. As previously noted, this insures the closure of the shutters 9 and 54 thereby preventing transmission of light to the respective films 10 and 32. The shutter 3 is manually opened to expose the subject and present the subject through the viewing window 51. When the subject is properly located with respect to the lens 2, the mirror 52 is pivoted upwardly to the phantom line position. This results in a closing of limit switch 55 which may be connected in the circuit shown in FIG. 4 to condition the camera 1 for operation.

A main start button switch 56 is connected in series with the limit switch 55, a normally closed shutter actuated switch 57 which is coupled to the shutter 3 and a control relay 58. With the mirror 52 pivoted from the viewing position, actuation of the pushbutton switch 56 energizes the relay 58 and the related set of contacts 58-1 which are normally open and closed as a result of the energization of relay 58. The normally opened contacts 58-1 are connected in series parallel with three solenoids 59, 60 and 61, coupled respectively to shutters 3, 9 and 54. When the contacts 58-1 close, the three solenoids are energized to open the respective shutters 9 and 54 first and then main shutter 3. The image is transmitted to the dividing mirror and the two images are simultaneously applied one to the negative film 32 aligned with the mirror 5, and the second to the positive film 10 aligned with the enlarging lenses 7.

The contacts 58-1 are also connected via a jumper lead 62 in parallel with the viewing mirror actuated limit switch 55 and the pushbutton switch 56. The relay 58 is, therefore, maintained energized independently of the start button switch 56.

However, when the shutter 3 opens, it mechanically opens the switch 57 in series with the relay 58 to reset the relay 58 after a predetermined time, thereby resetting the circuit including the deenergizing of the solenoids 59, 60 and 61 to close the respective shutters.

A second switch 63 is coupled to the first shutter switch 57. The second switch 63 is a normally opened switch which is closed upon the opening of the shutter 3. The switch 63 is connected in series parallel with a pair of marking lights 64 and 65 forming a part of the marking devices 43 and 44 to apply the related identifying number to the two films.

In addition, a relay 66 is connected in parallel with the parallel lights 64 and 65. The relay 66 controls a set of normally open contacts 66-1 which are connected in series with the drive motor 29 to the power lines 67 which may be connected to any suitable source, such as a battery or the usual 110 A.C. volt power system. The energization closes the relay contacts 66-1 and the motor 29 rotates. The associated limit switch 30 closes and is held closed until the motor 29 has gone through a selected cycle. The negative film 32, which has been exposed, is transferred to the take-up roller 36 and simultaneously the positive film strip 10, which has also been exposed, is moved outwardly through the wall 18 and pressure roller 20. The cycle automatically terminates as a result of the opening of the limit switch 30. The two films 10 and 32 are thereby properly indexed one step to align a new unexposed portion of the films in the camera after the shutter has closed.

As the positive film 10 is moved between the developing roller 20, a part of the developing strip 21 is withdrawn and the developing liquid is applied to its face and thereby transferred to the film 10. The liquid directly develops the picture to permit a practically instantaneous presentation of the image which has been taken.

Figure 4:
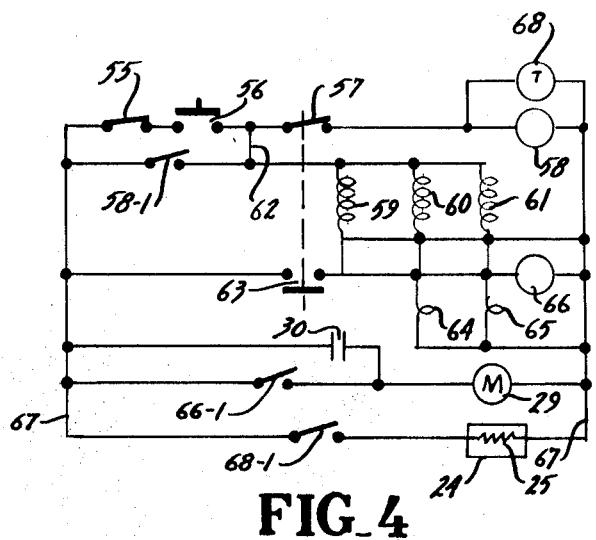
FIG. 4 is a schematic circuit diagram illustrating the control circuit for interrelating the operation of the structure shown in FIG. 1.

The film 10 and developing liquid strip 21 with the developing liquid therebetween passes through the heating passageway where it is heated to a desired level. The heating coil or element 25, as shown in FIG. 4, is connected to the power line 67 in series with a set of timing contacts 68-1 of a timing relay 68. The timing relay 68 is connected in parallel with the relay 58, and is thus energized upon tripping of the shutters. The element 25 is maintained energized by the timing relay 68 for the automatic cycle of the camera and thus provides the desired raised temperature for developing of the positive print. This will permit taking of a series of pictures in rapid succession.

The last taken picture is, of course, held in the heated passageway. A knife unit 69 may be provided in the holder 11 and slidably mounted for severing of the film 10 and adjacent strip 21 for removal thereof.

The apparatus may be modified to employ the known transfer direct positive concept by reversing the position of the portrait negative film and the direct positive. In this case, the deflection created by mirror 5 will result in the reversal of the image on the negative film. This will, of course, require special reverse processing of the negative film because of the reverse image. The developer-printer cannot distinguish between a negative film having a direct image and one having a reverse image, and consequently the system is not directly adapted to commercial practice. However, by constructing the marking devices to have a special character which is applied to the negative film, the developer-printer can be directly informed of the necessity of reverse exposing the particular negative film.

Although shown as a single incorporated camera structure, the present invention can be formed as an auxiliary adapter for attachment to the conventional portrait camera having a housing to which a film magazine is releasably attached. The internal lens and mirror structure may be interconnected to a suitable mounting plate similar to that presently provided for carrying a negative film magazine and having means to releasably interconnect to the back side of a camera. The positive film would be provided in a separate magazine assembly secured to the plate and projecting into the camera. The developer magazine may be secured to the back side of the plate with a nozzle opening for interconnection of the dry film strip and positive film magazine similar to that shown in the previous embodiment and a connecting drive cable provided to interconnect the film motor to drive the positive film. For initial viewing of the subject matter, the negative magazine is moved to the side of the opening. After properly locating of the subject with respect to the camera, the magazine is moved into alignment with the ground glass plate generally in accordance with known constructions. The system is then operated as previously described.

The present invention thus provides a means of simultaneously producing a negative and a positive of the same image wherein the positive can be enlarged relative to the size of the negative. The improved camera is particularly adapted for portrait type photography and the like, where the final portrait is made from a negative, but the proof copy can be instantaneously provided to the customer.

I claim:

1. A camera having a lens for projecting an image beam of a subject comprising a support means, a beam splitting means aligned with the lens to establish simultaneously a first image beam and a second image beam of the subject, a negative film aligned with said first image beam and a positive film aligned with said second image beam, a developing means to directly develop said exposed positive film and produce a positive image as the film is withdrawn from alignment with said second image beam path, a cartridge for said positive film and for said developing means, said cartridge including a film magazine connected by a flat housing portion to a guide means in the housing portion adjacent a developer housing portion, a developing strip in the developer housing portion, said film and strip being threaded past said guide means, a liquid applicator in said housing portion to apply a developing liquid to the strip as the strip is withdrawn from the developer housing, a housing for said cartridge, said housing having a passageway means aligned with said guide means to receive said superposed film and strip, heating means in said passageway means for establishing a selected developing temperature within said passageway means, a first shutter aligned with the first lens, a second shutter aligned with the negative film and a third shutter aligned with the positive film, a composing opening, a mirror movably mounted with a first position intercepting one of said beams and projecting the beams to said composing opening for initial locating of the camera relative to the subject and with a second position spaced from said beams, and interlock means coupled to said mirror and said first, second and third shutter to close the shutters with said mirror in said first position, and means to separately open said first shutter during composing, said interlock means including an interlock switch means actuated by said mirror, a start switch means, a shutter switch actuated by the first shutter, a relay means connected in series circuit with said interlock switch means, said start switch means and said shutter switch, said relay means having contacts connected to shutter opening means for opening said three shutters and to reset said relay means through said shutter actuated switch, a drive control means for moving said films, a second shutter actuated switch coupled to said first shutter actuated switch and connected to the drive control means to start said drive control means, said drive control means having drive means actuated switch means to establish a predetermined period of operation, and a timing means connected in parallel with said relay means, said timing means connecting said heating means to a power source.

2. A camera having a lens for projecting an image beam of a subject comprising a support means, a beam splitting means aligned with the lens to establish simultaneously a first image beam and a second image beam of the subject, a negative film aligned with said first image beam and a positive film aligned with said second image beam, developing means coupled to said camera to directly develop said exposed positive film and produce a positive image as the film is withdrawn from alignment with said second image beam path, a first shutter aligned with the first lens, a second shutter aligned with the negative film and a third shutter aligned with the positive film, a composing opening, a mirror movably mounted with a first position to intercept one of said beams and project the beam to said composing opening for initial locating of the camera relative to the subject and with a second position spaced from said beams, and interlock means coupled to said mirror and said first, second and third shutter to close the shutters with said mirror in said first position, and means to separately open said first shutter during composing.

3. The camera of claim 2 wherein said films are mounted as an integral elongated film strip for stepped movement into alignment with the related beams, and having a drive means coupled to said films to transfer said negative film from a first storage means to a second storage means, and to simultaneously transfer said positive film through said developing means, and means interconnecting said drive means and said interlock means whereby said drive means cannot be operated during composing.

4. The camera of claim 3 wherein said interlock means includes an interlock switch means actuated by said mirror, a start switch means, a shutter switch actuated by the first shutter, a relay means connected in series circuit with said interlock switch means, said start switch means and said shutter actuated switch, said relay means having contacts connected to shutter opening means for simultaneously opening said three shutters and to reset said relay means through said shutter actuated switch, a drive control means, a second shutter actuated switch coupled to said first shutter actuated switch and connected to the drive control means to start said drive means, said drive control means having drive means actuated switch means to establish a predetermined period of operation.

References Cited

UNITED STATES PATENTS

| | | | |
|---|---|---|---|
| 2,018,891 | 10/1935 | Kean | 95—18 |
| 2,576,022 | 11/1951 | Land | 95—13 |
| 3,254,582 | 6/1966 | Budde | 95—13 |

SAMUEL S. MATTHEWS, Primary Examiner

E. M. BERO, Assistant Examiner

U.S. Cl. X.R.

95—13

UNITED STATES PATENT OFFICE
CERTIFICATE OF CORRECTION

Patent No. 3,608,456      Dated September 28, 1971

Inventor(s) Allan H. Hauser

It is certified that error appears in the above-identified patent and that said Letters Patent are hereby corrected as shown below:

Column 1, line 51, "quality" should read -- duality --.

Signed and sealed this 9th day of May 1972.

(SEAL)
Attest:

EDWARD M. FLETCHER, JR.
Attesting Officer

ROBERT GOTTSCHALK
Commissioner of Patents